United States Patent
Cislo (10) Patent No.: US 10,082,172 B2
(45) Date of Patent: Sep. 25, 2018

(54) PLAIN BEARING AND/OR SYSTEMS INCORPORATING SUCH BEARINGS

(71) Applicant: Lawrence Cislo, Brighton, MI (US)

(72) Inventor: Lawrence Cislo, Brighton, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 85 days.

(21) Appl. No.: 15/130,055

(22) Filed: Apr. 15, 2016

(65) Prior Publication Data

US 2016/0333926 A1 Nov. 17, 2016

Related U.S. Application Data

(60) Provisional application No. 62/147,866, filed on Apr. 15, 2015.

(51) Int. Cl.
| | |
|---|---|
| *F16C 17/10* | (2006.01) |
| *F16C 33/74* | (2006.01) |
| *F16C 17/02* | (2006.01) |
| *F16K 1/22* | (2006.01) |
| *F16C 33/04* | (2006.01) |
| *F16C 33/08* | (2006.01) |
| *F16C 33/10* | (2006.01) |
| *F16C 17/22* | (2006.01) |
| *F16C 33/06* | (2006.01) |
| *F16C 33/20* | (2006.01) |

(52) U.S. Cl.
CPC .............. *F16C 17/10* (2013.01); *F16C 17/02* (2013.01); *F16C 17/22* (2013.01); *F16C 33/04* (2013.01); *F16C 33/06* (2013.01); *F16C 33/08* (2013.01); *F16C 33/10* (2013.01); *F16C 33/20* (2013.01); *F16C 33/74* (2013.01); *F16K 1/224* (2013.01); *F16C 2360/22* (2013.01)

(58) Field of Classification Search
CPC .......... F16C 17/10; F16C 17/02; F16C 17/22; F16C 33/04; F16C 33/06; F16C 33/08; F16C 33/10; F16C 33/20; F16C 33/74; F16K 1/224

See application file for complete search history.

(56) References Cited

U.S. PATENT DOCUMENTS

| | | | | |
|---|---|---|---|---|
| 2,881,032 A | * | 4/1959 | Connolly | F16C 33/20 384/145 |
| 3,300,137 A | * | 1/1967 | Murphy | F02M 31/083 137/527 |
| 3,578,828 A | * | 5/1971 | Orkin | F16C 33/10 384/129 |
| 3,695,650 A | * | 10/1972 | Stuck | B60G 7/005 384/202 |
| 3,774,879 A | * | 11/1973 | Zink | F02D 9/1025 123/543 |
| 4,022,424 A | * | 5/1977 | Davis | F16K 1/2268 251/214 |

(Continued)

*Primary Examiner* — Thomas R Hannon
(74) *Attorney, Agent, or Firm* — Mark Ussai; SKF USA Inc. Patent Dept.

(57) ABSTRACT

A plain bearing which may have superior operational characteristics, such as the ability to work in high temperature environments with aluminum housings, or which may have the ability to support an axial load, or which may have an outer ring formed entirely of polymer or lubricant impregnated polymer, and/or components thereof.

15 Claims, 7 Drawing Sheets

(56) References Cited

U.S. PATENT DOCUMENTS

| | | | | |
|---|---|---|---|---|
| 4,296,978 A | * | 10/1981 | Loser | F16C 17/10 |
| | | | | 384/441 |
| 4,357,249 A | * | 11/1982 | Mellor | C10M 111/00 |
| | | | | 384/300 |
| 4,660,996 A | * | 4/1987 | Marshall | F02D 9/106 |
| | | | | 384/125 |
| 4,877,339 A | * | 10/1989 | Schuster | F02D 9/04 |
| | | | | 251/303 |
| 8,721,184 B2 | * | 5/2014 | Voisine | F16C 23/046 |
| | | | | 277/917 |
| 9,121,511 B2 | * | 9/2015 | Hodebourg | F02D 9/04 |
| 9,388,907 B2 | * | 7/2016 | Gerards | F02D 9/04 |
| 2006/0059903 A1 | * | 3/2006 | Gerards | F16K 1/22 |
| | | | | 60/324 |

* cited by examiner

FIG. 20                FIG. 21 and

PLAIN BEARING AND/OR SYSTEMS INCORPORATING SUCH BEARINGS

BACKGROUND

The present invention is generally directed to bearings and, more specifically, to plain bearings and/or components thereof which are adapted for longer service life, better thermal characteristics, and/or which may support both axial and radial loads.

Conventional plain bearings are formed with a steel inner ring having a steel outer ring positioned thereover. When used with certain housings (such as those made of aluminum) the thermal characteristics of the steel outer ring can be undesirable and lead to leakage between the housing and the plain bearing. Additionally, the amount of lubrication needed for conventional plain bearings can be high due to the high heat generated by two steel ring surfaces generating friction therebetween from sliding contact. It may be advantageous to provide a plain bearing or component thereof which may: have improved thermal characteristics; an outer ring formed entirely of polymer; an outer ring formed entirely of lubricant impregnated polymer; an outer ring formed by a plurality of ring segments; support both axial and radial loads; be capable of sustaining a pressure differential axially across the bearing; that is suitable for use as part of new equipment or can be retrofit into existing equipment; be used in a throttle body housing; and/or provides a longer service life.

SUMMARY OF THE INVENTION

Briefly speaking, one embodiment of the present invention is directed to a throttle body assembly including a throttle body housing defining a bore therein. A throttle shaft may be located in the throttle body housing. A plain bearing can be disposed in the bore of the throttle body housing. The plain bearing includes an inner ring and an outer ring. The inner ring is disposed about the throttle shaft and is configured to rotate therewith. The outer ring overlies and is in direct sliding contact with the inner ring. The outer ring is disposed in the bore. The plain bearing is configured to support both axial and radial loads.

In another aspect, one embodiment of the present invention is directed to a plain bearing including an inner ring comprises metallic material and having first and second axial ends. An outer ring comprises polymeric material. The outer ring overlies and is in direct sliding contact with the inner ring. The inner ring has first and second axial ends and an outer surface that slidably engages the outer ring and has a contouring which includes at least one of the group of:

(1) the outer surface being convex; (2) having a shoulder which extends radially outwardly from the outer surface on at least one of the first and second axial ends; and (3) having a protuberance thereon which extends circumferentially along the outer surface. The contouring of the outer surface results in the plain bearing being configured to carry both axial and radial loads.

In another aspect, one embodiment of the present invention is directed to a plain bearing including an inner ring and having first and second axial ends. An outer ring is entirely formed by polymeric material. The outer ring overlies and is in direct sliding contact with the inner ring. The inner ring has first and second axial ends and an outer surface that slidably engages the outer ring and has a contouring which includes at least one of the group of: (1) the outer surface being convex; (2) having a shoulder which extends radially outwardly from the outer surface on at least one of the first and second axial ends; and (3) having a protuberance thereon which extends circumferentially along the outer surface. The contouring of the outer surface results in the plain bearing being configured to carry both axial and radial loads.

In another aspect, one embodiment of the present invention is directed to a plain bearing including an inner ring. An outer ring comprises a plurality of ring segments.

The plurality of ring segments can be arranged end-to-end circumferentially around the inner ring such that the outer ring overlies and is in direct sliding contact with the inner ring. A seal may be disposed over at least a portion of the outer ring to retard radial movement of the plurality of ring segments away from the inner ring.

In another aspect, one embodiment of the present invention is directed to a plain bearing, including an inner ring. An outer ring comprises a plurality of ring segments. The plurality of ring segments can be arranged end-to-end circumferentially around the inner ring such that the outer ring overlies and is in direct sliding contact with the inner ring.

In another aspect, one embodiment of the present invention is directed to a plain bearing including an inner ring and an outer ring. The outer ring overlies and is in direct sliding contact with the inner ring. The plain bearing is configured to support both axial and radial loads.

In another aspect, one embodiment of the present invention is directed to a plain bearing including an inner ring and an outer ring. The outer ring is formed entirely of polymeric material and overlies and is in direct sliding contact with the inner ring. The plain bearing is configured to support both axial and radial loads.

In another aspect, one embodiment of the present invention is directed to a plain bearing including an inner ring and an outer ring. The outer ring overlies and is in direct sliding contact with the inner ring. The plain bearing is configured to support a pressure differential axially across the bearing.

In another aspect, one embodiment of the present invention is directed to a plain bearing including an inner ring and an outer ring. The outer ring overlies and is in direct sliding contact with the inner ring. Annular seals are positioned on axial ends of the outer ring that form a seal with a portion of the inner ring to retain lubrication between the inner and outer rings and prevent leakage of lubricant from the bearing.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the bearing and designated parts thereof. The term "direct sliding contact", as used in the claims and in the associated portions of the specification, means "two objects that are adjacent to each other and in abutting contact without another object therebetween, not including any lubricant located therebetween". In other words, the presence of a normal amount of lubricant between an inner ring 46 and an outer ring 48 does not prevent the inner ring 46 and the outer ring 48 from being considered to be in direct sliding contact. However, a layer of lubricant that forms a hydrostatic pressure seal and significantly spaces the inner and outer rings from each other would prevent direct sliding contact. The term "axial" is used in the claims and the corresponding portions of the specification in connection with the various surfaces of the bearing and associated components. However, those of ordinary skill in the art will appreciate that the use of the term "axial" or "radial" does not imply a precisely linear and/or horizontal surface but instead is used to identify a surface in general, unless stated otherwise. For example, an axial surface may include a sawtooth profile, a channel, or the like therein. Similarly, the term "radial" as used in the claims and the corresponding portions of the specification in connection with various surfaces of the bearing and associated components does not imply a precisely linear and/or vertical surface, but is also used to identify a surface in general. The term "approximately", as used in the claims and the associated portions of the specification in conjunction with measurements or ranges, is defined as meaning "plus or minus ten percent". The language "at least one of 'A', and 'C',"  as used in the claims and/or in corresponding portions of the specification, means "any group having at least one 'A'; or any group having at least one 'B'; or any group having at least one 'C'; —and does require that a group have at least one of each of 'A', 'B', and 'C". Additionally, the words "a" and "one" are defined as including one or more of the referenced item unless specifically stated otherwise. The terminology includes the words above specifically mentioned, derivatives thereof, and words of similar import.

Referring to FIGS. 1-21 wherein like numerals indicate like elements throughout, there are shown preferred embodiments of a plain bearing 30 (hereinafter also referred to as a "bearing" for convenience) which are preferably used to provide increased service life and performance.

The bearing 30 can preferably support axial and radial loads. It is also preferred that the bearing 30 has superior performance characteristics under elevated temperatures and/or has the ability to support a pressure differential axially across the bearing 30.

While the bearing 30 will be discussed in conjunction with a throttle body assembly 32 below, those of ordinary skill in the art will appreciate from this disclosure that the bearing 30 can be used in any mechanical system or can be provided on its own without departing from the scope of the present invention. For example, the bearing 30 may be used as part of a gear train that interfaces with an electronic gas recirculation system or the like.

Figure 1:
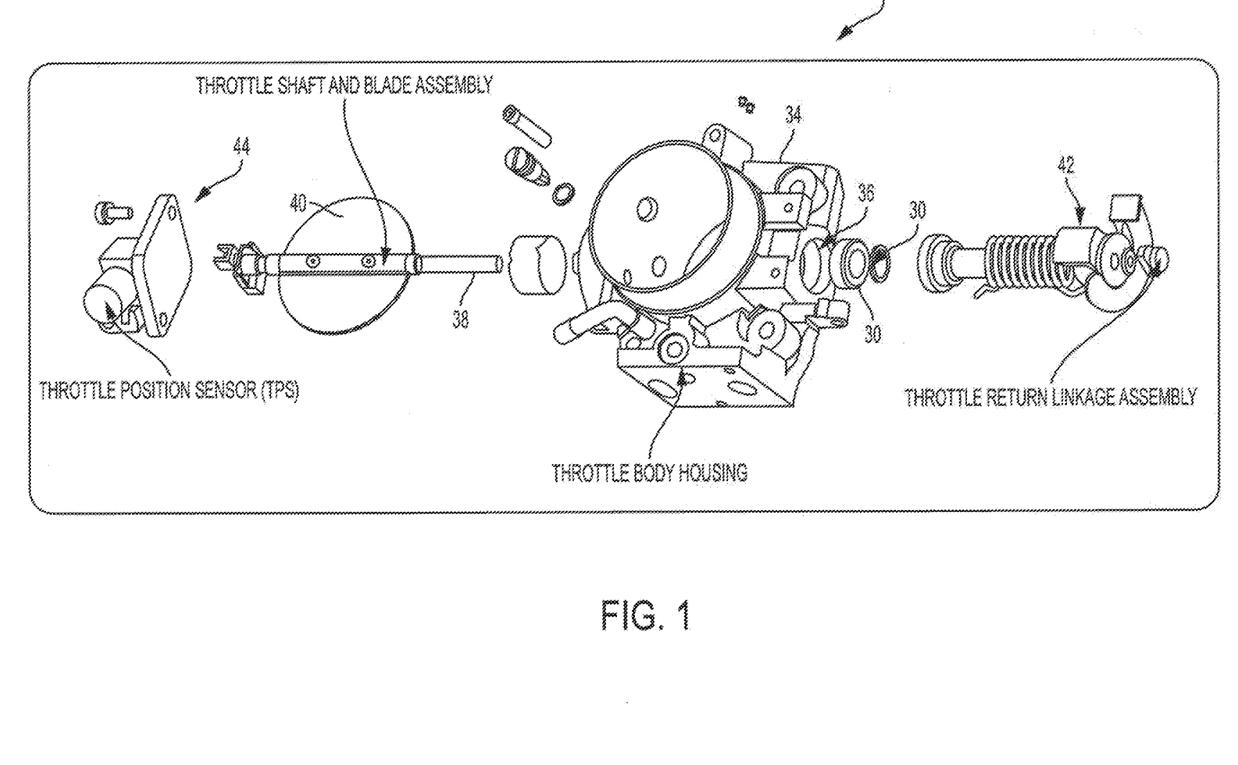
FIG. 1 is an exploded view of a throttle body assembly including a plain bearing according to a preferred embodiment of the present invention; the plain bearing is preferably disposed within a bore in the throttle body housing; a throttle shaft can be positioned through: the throttle body housing, the bore, and the inner ring of the plain bearing; the inner ring may be secured to the throttle shaft to rotate therewith; it is preferred that the outer ring of the plain bearing (and perhaps a portion of an annular seal) form a seal with a sidewall of the bore.

Referring to FIG. 1, one example of an application in which the bearing 30 can be used is with the throttle body assembly 32. The throttle body assembly 32 preferably includes a throttle body housing 34. The throttle body housing 34 is preferably formed of a suitable high-strength, durable material, such as aluminum or the like. However, those of ordinary skill in the art will appreciate from this disclosure that any suitable material can be used for the throttle body housing 34 without departing from the scope of the present invention. The throttle body housing 34 preferably defines a bore 36 therein. A throttle shaft 38 may be located in the bore 36 of the throttle body housing 34. The throttle shaft 38 may include a vanes 40 used as part of a butterfly valve. The throttle body assembly 32 preferably rotates the throttle shaft 38 and vanes 40 of the butterfly valve in a reciprocating fashion through an approximately ninety degree (90°) range of motion. A throttle return linkage assembly 42 and throttle position sensor 44 may also be incorporated into the throttle body assembly 32. The bearing 30 is preferably disposed in the bore 36 of the throttle body housing 34.

Figure 2:
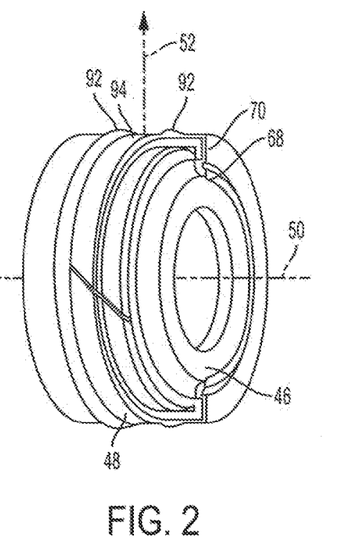
FIG. 2 is a perspective partial cross-sectional view of a first preferred embodiment of the plain bearing; an outer ring is preferably positioned on an inner ring and secured thereto via annular seals; the outer ring may be formed by a plurality of ring segments; the outer ring is preferably formed entirely of polymeric material or entirely of lubricant impregnated polymeric material; the right annular seal is shown in partial cross section to illustrate the sealing of lips against a portion of the inner ring.

Referring to FIGS. 2-5, in one embodiment, the bearing 30 preferably includes an inner ring 46 and an outer ring 48. The inner ring 46 is preferably disposed about the throttle shaft 38 and is configured to rotate therewith. The outer ring 48 overlies and is in direct sliding contact with the inner ring 46. The outer ring 48 is preferably located in the bore 36. The bearing 30 is preferably configured to support both axial and radial loads. Referring specifically to FIG. 2, the axial direction is shown by axis 50. The radial direction is shown by axis 52.

Figure 3:
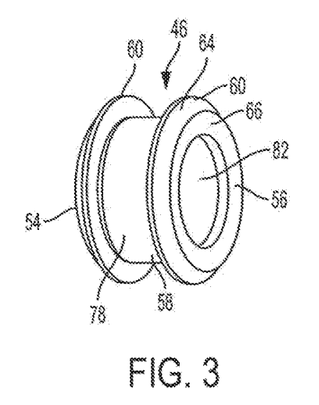
FIG. 3 is a perspective view of the inner ring of the plain bearing of FIG. 2; the inner ring preferably has an outer surface that is generally cylindrical; shoulders are preferably located at first and second axial and of the outer surface to axially delimit motion of the outer ring; semi-concave portions on the outer axial surfaces of the shoulders are preferably configured to form a mating surface for lip of the annular seals; the central passageway of the inner ring is preferably cylindrical.
Figure 14:
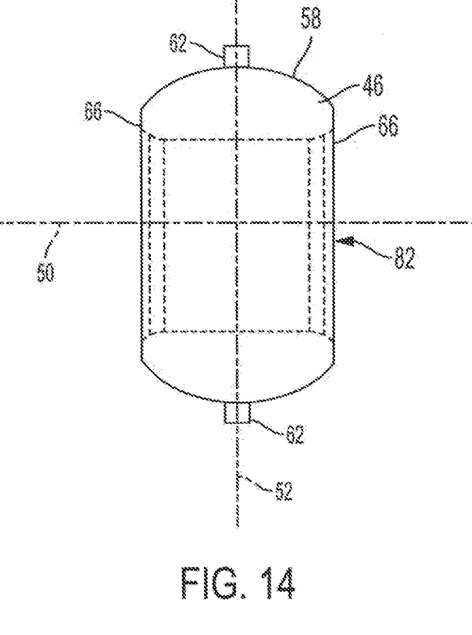
FIG. 14 is a front side elevational view of an inner ring of the bearing according to another embodiment of the present invention; the inner ring has an outer surface with a protuberant thereon; the protuberant preferably mates with a groove in the inner surface of the outer ring to increase the axial load that the bearing can support during operation.
Figure 15:
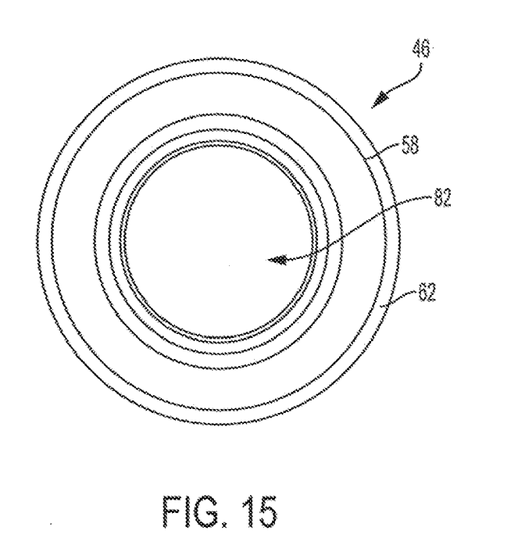
FIG. 15 is a side elevational view of the inner ring of FIG. 14.

Referring to FIG. 3, it is preferred, but not necessary, that the inner ring has first and second axial ends 54, 56 and an outer surface 58 that slidably engages the outer ring 48 and has a contouring which includes at least one of the group of: (1) the outer surface 58 being convex (as best shown in FIGS. 7, and 10-13); (2) having a shoulder 60 which extends radially outwardly from the outer surface 58 on at least one of the first and second axial ends 54, 56 (as best shown in FIGS. 2 and 3); and (3) having a protuberance 62 thereon which extends circumferentially along the outer surface 58 (as best shown in FIGS. 14 and 15). It is preferred that the contouring of the outer surface 58 results in the bearing 30 being configured to carry an axial load. The above-mentioned contouring of the outer surface 58 and the associated figures will be described in more detail below. Those of ordinary skill in the art will appreciate from this disclosure that contouring of the outer surface 58 may be omitted without departing from the scope of the present invention.

The inner ring 46 is preferably formed of a high-strength, durable material, such as stainless steel or the like. However, those of ordinary skill in the art will appreciate from this disclosure that the inner ring 46 can be formed of any material without departing from the scope of the present invention.

Referring to FIGS. 2-5, in one embodiment, the inner ring 46 includes the outer surface 58 having a generally cylindrical shape located between the first and second axial ends 54, 56 and along which the outer ring 48 is configured to slide. While a generally cylindrical outer surface 58 is shown, those of ordinary skill in the art will appreciate from this disclosure that the outer surface 58 may have a conical, a regular, or multiple sloped configuration when viewed in axial cross-section without departing from the scope of the present invention. When viewed in axial cross section, one example of a multiple slope configuration would be an outer surface that has a first portion formed by a line that is generally axially aligned and a second portion that is formed by a line askew from the axial direction. It is preferred that each of the first and second axial ends 54, 56 include a shoulder 60 having an increased radius relative to the remainder of the outer surface 58. As best shown in FIG. 3, the outer surface 58 meets the shoulders 60 at approximately a 90° intersection. The shoulder preferably includes a generally semi-concave portion 64 along an axially outwardly facing section. The semi-concave portion 64 shown in FIG. 3 is best viewed in the upper right portion of the figure which illustrates the semi-concave portion 64 starting at a radially outermost point on the shoulder 60 and extending generally downwardly and outwardly until reaching an end face 66 of the inner ring 46. As will be discussed in more detail below, the preferable semi-concave portion 64 facilitates engagement with a lip 68 of an annular seal 70. The shoulders 60 on the first and second axial ends 54, 56 of the inner ring 46 preferably axially delimit motion of the outer ring 48.

Referring to FIG. 3, a central passageway 82 through the inner ring 46 is preferably configured for mounting on a shaft (which may be a throttle shaft or some other rotating component). The central passageway 82 is preferably cylindrical in shape to accommodate a cylindrically shaped shaft. However, those of ordinary skill in the art will appreciate from this disclosure that the central passageway 82 can have any shape when viewed in radial cross-section without departing from the present invention. For example, the central passageway 82 may have a radial cross-section with the shape of a hexagon, irregular, octagon, or any other suitable shape. Using an inner ring 46 with a central passageway 82 having a noncircular radial cross-section can facilitate maintaining alignment between the inner ring 46 and the shaft. When used with a shaft, the inner ring 46 is preferably secured thereto.

The outer ring 48 is preferably formed of a polymer or a blend of polymers. However, those of ordinary skill in the art will appreciate from this disclosure that the outer ring 48 can be formed of any material without departing from the scope of the present invention. For example, the outer ring 48 may be formed by a lubricant impregnated polymer, or steel, or any other material without departing from the scope of the present invention.

Referring specifically to FIGS. 4, 8, and 16-18, in one embodiment, the outer ring may comprise a plurality of ring segments 72. While it is preferred that two generally equal sized ring segments 72 are used to form the outer ring 48, those of ordinary skill in the art will appreciate from this disclosure that any number of ring segments 72 may be used without departing from the scope of the present invention. For example, three, five, seven ring segments 72, or a single solid outer ring 48 may be used without departing from the scope of the present invention.

Figure 4:
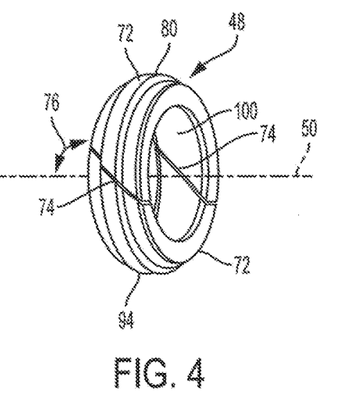
FIG. 4 is a perspective view of the outer ring of the plain bearing of FIG. 2; the outer ring is preferably, but not necessarily, formed by a plurality of ring segments which can be positioned end-to-end circumferentially around the inner ring; ends of the ring segments 72 are preferably angled relative to the axial direction; circumferential portion of the outer ring preferably extends radially outwardly farther than portions of the outer ring located proximate the axial ends of the outer ring.
Figure 16:
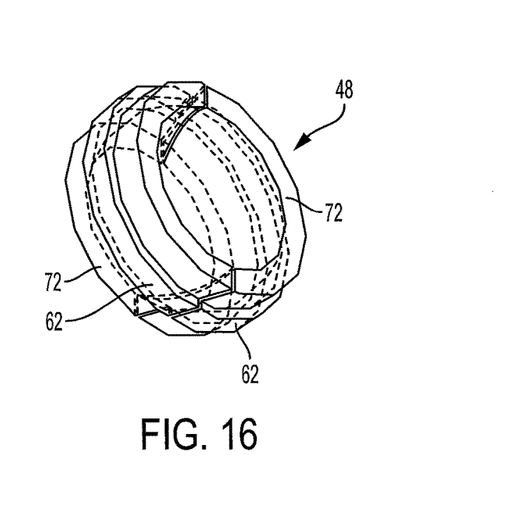
FIG. 16 is another perspective view of the outer ring of FIG. 8; the ends of the ring segments are aligned axially (as opposed to at an angle with the axial direction)
Figure 17:
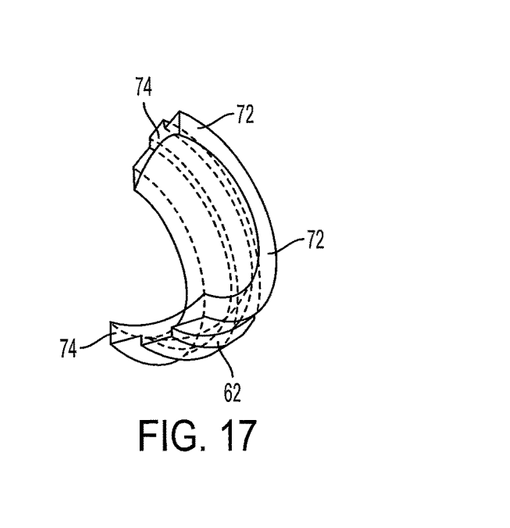
FIG. 17 is a perspective view of a single one of the ring segments of FIG. 16.
Figure 18:
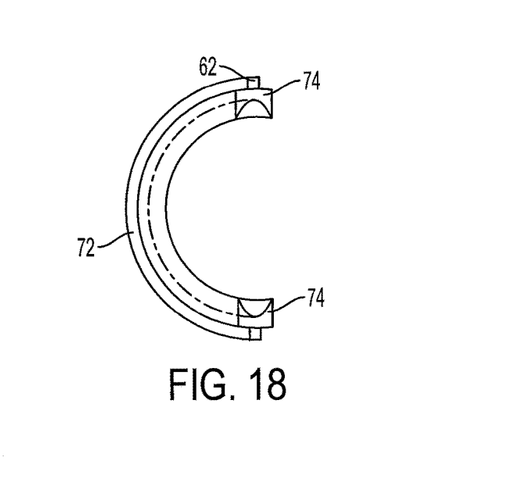
FIG. 18 is a second perspective view of a single one of the ring segments of FIG. 16.
Figure 19:
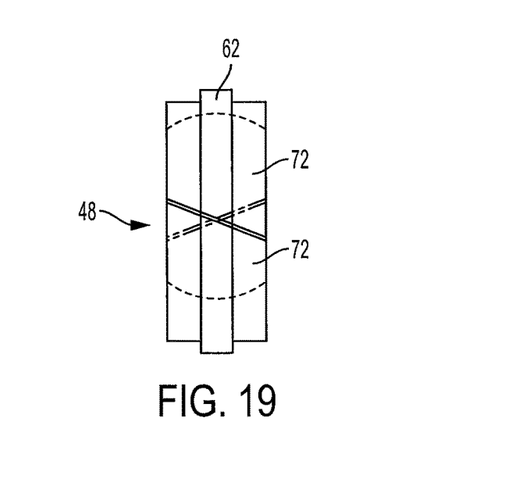
FIG. 19 is a front side elevational view of the outer ring of FIG. 8.
Figure 20:
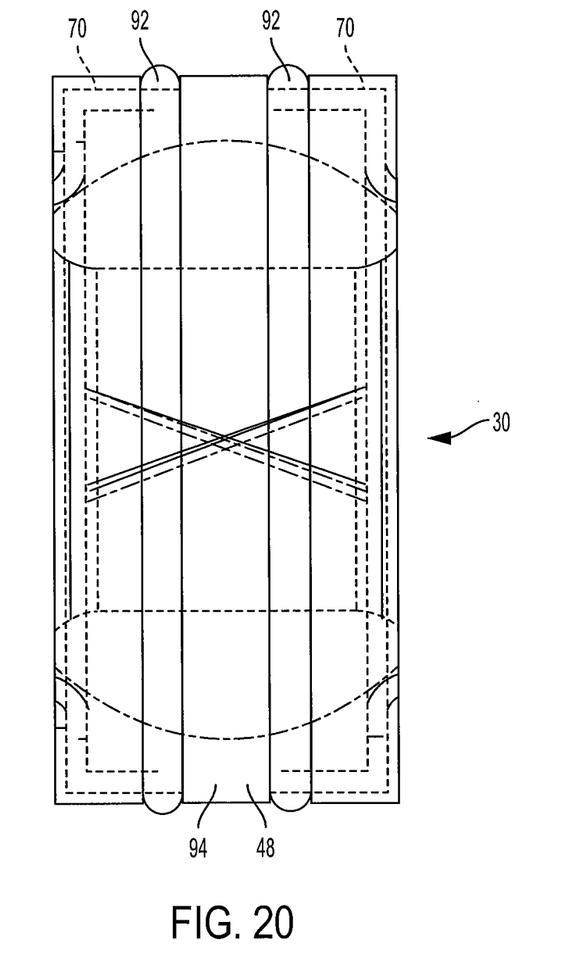
FIG. 20 is a front side elevational view of the outer ring of FIG. 19 with annular seals placed over each axial end thereof.
Figure 21:
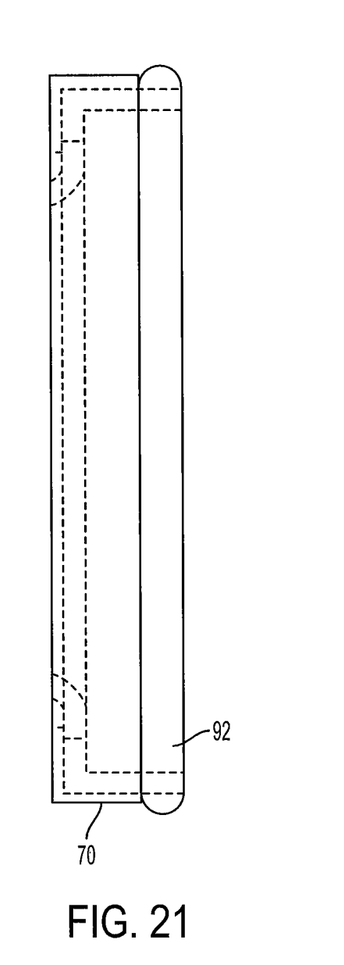
FIG. 21 is a front side elevational view of an annular seal.

Referring specifically to FIG. 4, it is preferred that ends 74 of the ring segments 72 meet at an angle 76 of between approximately twenty degrees (20°) and approximately seventy degrees (70°) as measured between that and 74 and the axial direction 50. Is more preferable still that the ends 74 of the plurality of ring segments 72 meet at an angle of approximately forty-five degrees (45°) relative to the axial direction 50. The angling of the ends 74 relative to the axial direction 50 facilitates the bearing 30 supporting axial loads under some circumstances and preferably makes it more difficult for a single ring segment 72 to be dislodged from the bearing 30 depending upon the axial direction in which the ring segment 72 is driven. For example, when the ring segment 72 which forms the upper half of the outer ring 48 in FIG. 4 is pushed generally leftwardly, the angled ends 74 of the ring segments 72 will facilitate resisting leftward motion of the upper ring segment 72. However, as shown in FIGS. 16-18, those of ordinary skill in the art will appreciate from this disclosure that the ring segments 72 ends 74 may be axially aligned (that is, not angled with respect to the axial direction 50) without departing from the scope of the present invention. Additionally, those of ordinary skill in the art will appreciate from this disclosure that the outer ring 48 may be formed by a single member without departing from the scope of the present invention. The outer ring 48 preferably has an inner surface 100 that is shaped to correspond to the outer surface 58 of the inner ring 46. That is, if the outer surface 48 has a convex shape then it is preferred that the inner surface 100 of the outer ring 48 has a generally matching concave shape. Similarly, if the inner ring 46 has a protuberance 62 thereon, then it is preferred that the inner surface 100 of the outer ring 48 has a generally corresponding groove therein to facilitate sliding motion therebetween.

Figure 10:
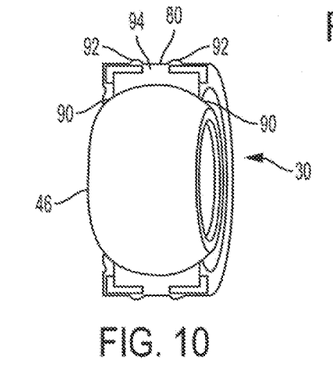
FIG. 10 is a partial cross-sectional view of the bearing of FIG. 6; a circumferential portion of the outer ring is preferably sandwiched between annular seals, but not covered, so that under certain temperature conditions, the circumferential portion of the outer ring can expand faster than would steel to provide the bearing with better overall thermal properties than prior art bearings.
Figure 11:
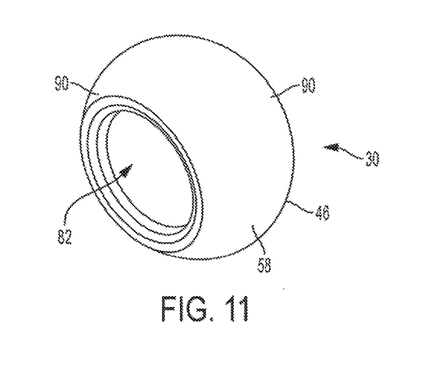
FIG. 11 is another perspective view of the inner ring of FIG. 7.
Figure 12:
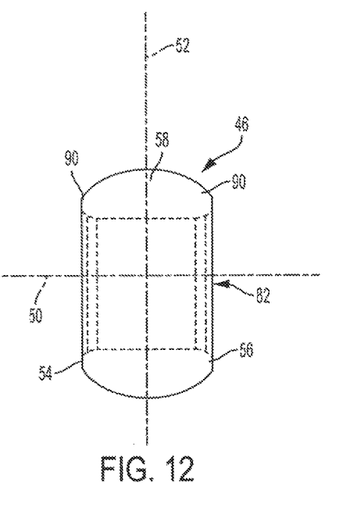
FIG. 12 is a front side elevational view of the inner ring of FIG. 11.
Figure 13:
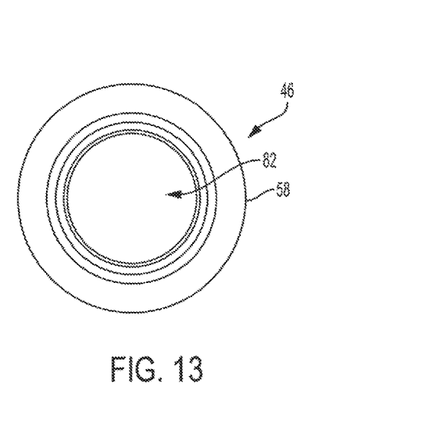
FIG. 13 is a side elevational view of the inner ring of FIG. 11.

The plurality of ring segments 72 can be arranged end-to-end along the circumference 78 of the inner ring 46 such that the outer ring 48 overlies and is in direct sliding contact with the inner ring 46. Referring to FIGS. 4 and 10 it is preferred that an outer surface 80 of the outer ring 48 have a central portion with an increased radius relative to side portions of the outer ring's outer surface 80. This preferably allows the central portion of the outer ring's outer surface 80 to be sandwiched between annular seals 70 (further described below). The bearing 30 is preferably operated over a range of at least approximately minus forty degrees Celsius (40° C.) to one hundred forty degrees Celsius (140° C.). When operating at over approximately one hundred degrees Celsius (100° C.) the polymer of the outer ring 48 that is sandwiched between the annular seals 70 preferably expands radially outwardly at a rate faster than steel (which is typically used in outer rings of deep groove ball bearings) so that the bearing 30 can maintain and improve its sealed connection with an aluminum housing which expands at a much greater rate than steel. In other words, by preferably forming the outer ring 48 entirely of polymer(s) and/or lubricant impregnated polymer(s) the coefficient of thermal expansion of the outer ring 48 results in superior performance when the bearing is integrated into an aluminum mechanism so that a proper seal therebetween is maintained at elevated temperatures. Those of ordinary skill in the art will appreciate from this disclosure that the bearing 30 can be configured to operate within any temperature range, no matter how limited, without departing from the scope of the present invention.

Figure 5:
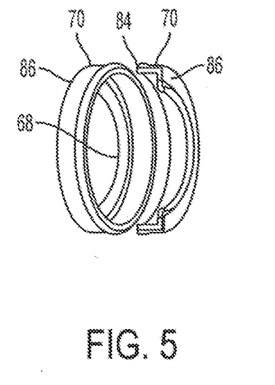
FIG. 5 is a perspective view of annular seals of the plain bearing of FIG. 2; the left annular seal is shown in its entirety and the right annular seal is shown in cross section; the annular seals preferably includes a generally L-shaped inner member which may be formed of a metallic material in which may be covered by an elastomer layer; a lip is preferably located on a radially inner portion of the annular seal; a protrusion is preferably located on an axially inner end of the annular seal.
Figure 6:
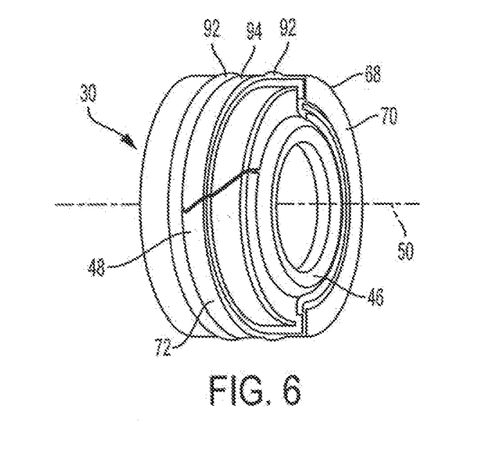
FIG. 6 is a perspective, partial cross-sectional view of a second preferred embodiment of a plain bearing according to the present invention; the plain bearing includes an inner ring with an outer ring that is configured to directly contact and slide thereover.

Referring to the FIGS. 5 and 6, an annular seal 70 is preferably, but not necessarily, disposed over at least a portion of the outer ring 48 to retard radial movement of the plurality of ring segments 72 away from the inner ring 46. In each of FIGS. 5 and 9, a pair of preferred annular seals 70 are shown. A left annular seal 70 is shown in its entirety and a right annular seal 70 is shown in axial cross-section. It is preferred, but not necessary, that the annular seals include a generally L-shaped steel inner member 84. Along the outer surface thereof of the inner member 84 of the annular seal 70 is a polymeric and/or elastomer layer 86 along a radial inner portion 88 of the annular seal 70 is a lip 68. The lip 68 is preferably formed of a suitable elastomer and is configured to seal against the inner ring 46. The preferable sealing of the lip 68 of the annular seal 70 against the inner ring 46 may accomplish two functions: (1) facilitates retention of lubricant between the inner ring 46 and the outer ring 48 and prevents leakage of lubricant therefrom; and (2) facilitates the ability of the bearing 32 maintain a pressure differential axially across the bearing 30. It is preferred, but not necessary that the bearing 30 seals with a housing and maintains and approximately three (3) Bar absolute pressure differential axially thereacross during operation.

Referring to FIG. 3, the semi-concave portion 64 of the endfaces 66 of the inner ring 46 preferably provide a mating surface to receive the lip 68 of the annular seal 70. This preferred engagement further facilitates the formation of a pressure seal on each side of the bearing 30.

Figure 7:
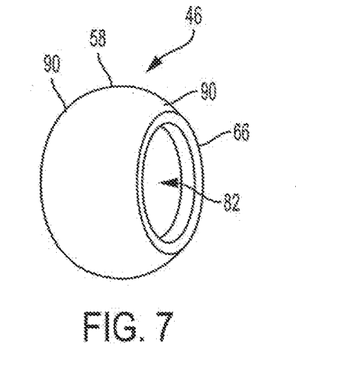
FIG. 7 is a perspective view of an inner ring of the bearing of FIG. 6; the inner ring has an outer surface that is preferably convex in shape; sections of the outer surface located proximate to the end faces of the inner ring provide mating surfaces for the lip of annular seals.

Referring to FIG. 7, in another embodiment of the inner ring 46 (which will be discussed in detail herein) the outer surface 58 preferably has a generally convex shape. Sections 90 of the outer surface 58 along the convex shape proximate the endfaces 66 of the inner ring 46 provide a mating surface against which the lips 68 of the annular seals 70 can form a dynamic seal which facilitates maintaining a pressure differential across the bearing 30. However, those of ordinary skill in the art will appreciate from this disclosure that the bearing 30 may be configured to support any pressure differential axially thereacross or to not hold a pressure differential without departing from the scope of the present invention.

It is preferred that the annular seal 70 is located over at least a portion of the first axial end 56 of the inner ring 46 and is configured to retard movement of the outer ring 48 radially away from the inner ring 46. When viewed in axial cross-section, the annular seal 70 preferably has an axial seal section 96 and a radial seal section 98. The axial seal section 96 is preferably configured to seal against the throttle body housing 34 (or any other housing with which the bearing 30 is engaged) when the bearing 30 is in the bore 36. The radial seal section 98 of the annular seal 70 may be configured to seal against at least a portion of the inner ring 46 to facilitate retaining lubricant between the inner ring 46 and the outer ring 48 and to facilitate maintaining a pressure differential axially across the plain bearing 30 when in use.

It is preferred that the annular seal 70 preferably include a protrusion 92 thereon. The protrusion 92 preferably extends generally circumferentially about the annular seal 78 and is located on an outer surface of the elastomer layer 86 proximate an inner axial end of the annular seal 70. The protrusion 92 is preferably configured to engage the throttle body assembly 32 (or any other housing into which the bearing 30 is positioned) when the bearing 30 is located in a bore 36 therein. Those of ordinary skill in the art will appreciate that the structure of the annular seals 70 may be altered or the annular seals 70 omitted altogether from the bearing without departing from the scope of the present invention.

Figure 8:
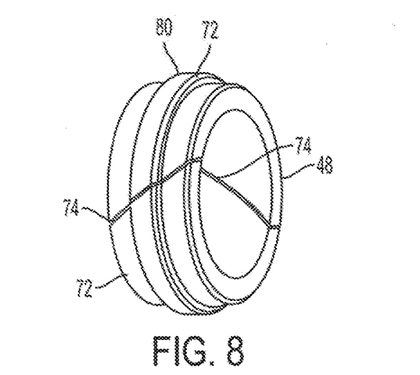
FIG. 8 is a perspective view of the outer ring of the plain bearing of FIG. 6; the inner surface of the outer ring is preferably complementarily shaped to the outer surface of the inner ring to facilitate smooth sliding thereover; it is preferred that the outer surface of the inner ring extend axially beyond the inner surface of the outer ring to provide sections along the outer surface to engage the lip of the annular seals.
Figure 9:
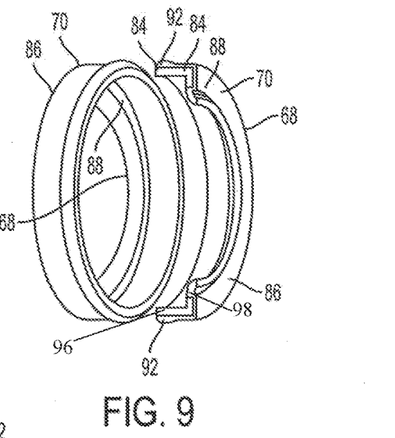
FIG. 9 is a perspective view of the annular seals of the plain bearing of FIG. 6 similar to that of FIG. 5.

Referring to FIGS. 4 and 8, it is preferred that the outer ring 48 include a circumferential portion 94 that is not covered by an annular seal 70 such that the outer ring 48 is configured to seal against the throttle body housing 34 (or any other housing into which the bearing 30 is inserted) when the bearing 30 is located in a bore 36 therein at least under some temperature conditions. It is preferred that when the bearing 30 is assembled, that the circumferential portion 94 of the outer ring 48 is sandwiched between inner portions of the annular seals 70. Thus, when the bearing 30 is operating under elevated temperatures (such as temperatures of ninety degrees Celsius (90° C.) or the like) in a housing that has a high coefficient of thermal expansion, the circumferential portion 94 of the outer ring 48 preferably expands at a high enough rate to maintain a seal between the bearing 30 and the associated housing. Those of ordinary skill in the art will appreciate from this disclosure that the circumferential portion 94 of the outer ring 48 can be omitted without departing from the scope of the present invention.

Referring to FIGS. 6-13, and a separate embodiment, the inner ring 46 preferably has an outer surface 58 that is generally convex. Referring to FIGS. 7 and 10, the outer surface 58 preferably includes sections 90 that are proximate the left and right sides of the outer surface 58 which form mating surfaces for the lip 68 of the annular seal 70. Referring specifically to FIG. 10, the convex shape of the inner ring 46 preferably allows the bearing 30 to support both axial and radial loads. Referring to FIGS. 14 and 15, another embodiment of the inner ring 46 is shown. A protuberance 62 is preferably located on the outer surface 58 of the inner ring 46. It is preferred that a corresponding groove (not shown) is present in the inner surface 100 of the associated outer ring 48. While preferably not impeding the sliding action between the inner and outer rings 46, 48, the protuberance 62 preferably increases the amount of axial load that can be borne by the bearing 30. The protuberance 62 preferably has a generally rectilinear shape and is located axially centrally along the outer surface 58 of the inner ring 46. However, those of ordinary skill in the art will appreciate that the protuberance 62 can be located at any axial location on the outer surface 58 of the inner ring 46 without departing from the scope of the present invention.

Additionally, more than one protuberance 62 can be located on the outer surface 58 without departing from the scope of the present invention. While the protuberance 62 is shown on a convex outer surface 58 of the inner ring 46, those of ordinary skill in the art will appreciate from this disclosure that the protuberance 62 may be used in conjunction with a cylindrically shaped outer surface, or any other shaped outer surface (such as conical), without departing from the scope of the present invention.

Referring to FIG. 1, one embodiment of the present invention preferably operates as follows. A plain bearing 30 may be adapted for use with a throttle body housing 34. The plain bearing preferably includes an inner ring 46 and an outer ring 48. The bearing is preferably capable of supporting both axial and radial loads.

While various shapes, configurations, and features have been described above and shown in the drawings for the various embodiments of the present invention, those of ordinary skill in the art will appreciate from this disclosure that any combination of the above features can be used without departing from the scope of the present invention. It is understood, therefore, that this invention is not limited to the particular embodiments disclosed, but is intended to cover all modifications which are within the spirit and scope of the invention as defined by the appended claims and/or shown in the attached drawings.

I claim:

1. A throttle body assembly, comprising:
   a throttle body housing defining a bore therein;
   a throttle shaft located in the throttle body housing; and
   a plain bearing disposed in the bore of the throttle body housing, the plain bearing comprising an inner ring and an outer ring, the inner ring being disposed about the throttle shaft and configured to rotate therewith, the outer ring overlies and is in direct sliding contact with the inner ring, the outer ring being disposed in the bore, wherein the inner ring has first and second axial ends and comprises:
   an outer surface having a generally cylindrical shape located between the first and second axial ends and along which the outer ring is configured to slide;
   each of the first and second axial ends including a shoulder having an increased radius relative to the outer surface,
   wherein the plain bearing is configured to support both axial and radial loads.

2. The throttle body assembly of claim 1, wherein the shoulder on each of the first and second axial ends of the inner ring axially delimits motion of the outer ring.

3. The throttle body assembly of claim 2, further comprising:
   the outer ring comprising a plurality of ring segments, wherein the plurality of ring segments can be arranged end-to-end along a circumference of the inner ring such that the outer ring overlies and is in direct sliding contact with the inner ring; and
   an annual seal disposed over at least a portion of the outer ring to retard radial movement of the plurality of ring segments away from the inner ring.

4. The throttle body assembly of claim 3, wherein the inner ring is formed of a metallic material and the outer ring is formed entirely of polymeric material.

5. A throttle body assembly, comprising:
   a throttle body housing defining a bore therein;
   a throttle shaft located in the throttle body housing; and
   a plain bearing disposed in the bore of the throttle body housing, the plain bearing comprising an inner ring and an outer ring, the inner ring being disposed about the throttle shaft and configured to rotate therewith, the outer ring overlies and is in direct sliding contact with the inner ring, the outer ring being disposed in the bore, wherein the inner ring has first and second axial ends and an outer surface that slidably engages the outer ring and has a contouring which includes at least one of the group of: (1) the outer surface being convex; (2) having a shoulder which extends radially outwardly from the outer surface on at least one of the first and second axial ends; and (3) having a protuberance thereon which extends circumferentially along the outer surface, the contouring of the outer surface resulting in the plain bearing being configured to carry an axial load
   wherein the plain bearing is configured to support both axial and radial loads, and
   an annular seal located over at least a portion of the first axial end of the inner ring and configured to retard movement of the outer ring radially away from the inner ring, wherein the annular seal, when viewed in axial cross-section, has an axial seal section and a radial seal section, the axial seal section being configured to seal against the throttle body housing when the plain bearing is in the bore and to seal against at least a portion of the outer ring, the radial seal section being configured to seal against at least a portion of the inner ring to facilitate retaining lubricant between the inner ring and the outer ring and to facilitate maintaining a pressure differential axially across the plain bearing when in use.

6. The throttle body assembly of claim 5, wherein the axial seal section of the annular seal includes a protrusion thereon configured to engage the throttle body assembly when the plain bearing is located in the bore.

7. The throttle body assembly of claim 6, wherein a circumferential portion of the outer ring is not covered by the annular seal such that the outer ring is configured to seal against the throttle body housing when the plain bearing is located in the bore at least under some temperature conditions.

8. The throttle body assembly of claim 7, wherein the outer ring is formed entirely of polymer.

9. The throttle body assembly of claim 8, wherein the throttle body housing is formed of aluminum, the outer ring being formed entirely of polymer facilitating maintaining a seal between the outer ring and the throttle body housing under elevated temperatures.

10. The throttle body assembly of claim 7, wherein the outer ring is formed entirely of lubricant impregnated polymer.

11. A plain bearing, comprising:
an inner ring formed of a metallic material and having first and second axial ends; and an outer ring formed of a polymeric material, the outer ring overlies and is in direct sliding contact with the inner ring;
wherein the inner ring has: first and second axial ends and an outer surface that slidably engages the outer ring and has a contouring which includes at least one of the group of: (1) the outer surface being convex; (2) having a shoulder which extends radially outwardly from the outer surface on at least one of the first and second axial ends; and (3) having a protuberance thereon which extends circumferentially along the outer surface, the contouring of the outer surface resulting in the plain bearing being configured to carry both axial and radial loads; and
an annular seal located over at least a portion of the first axial end of the inner ring and configured to retard movement of the outer ring radially away from the inner ring, wherein the annular seal, when viewed in axial cross-section, has an axial seal section and a radial seal section, the axial seal section being configured to seal against at least a portion of the outer ring, the radial seal section being configured to seal against at least a portion of the inner ring to facilitate retaining lubricant between the inner ring and the outer ring and to facilitate maintaining a pressure differential axially across the plain bearing when in use.

12. The plain bearing of claim 11, wherein the axial seal section of the annular seal includes a protrusion thereon.

13. The plain bearing of claim 12, wherein a circumferential portion of the outer ring is not covered by the annular seal such that the outer ring is configured to thermally expand radially outwardly faster than steel.

14. The plain bearing of claim 11, wherein the outer ring is formed entirely of polymer.

15. The plain bearing of claim 11, wherein the outer ring is formed entirely of lubricant impregnated polymer.

\* \* \* \* \*